July 24, 1973   B. CHRISTIAENS ET AL   3,748,243
PROCESS FOR THE PRODUCTION OF 1,1,1-TRICHLOROETHANE
Filed June 7, 1971   5 Sheets-Sheet 5

INVENTORS.
Bernard Christiaens
Guy Martens

BY Spencer & Kaye

ATTORNEYS.

United States Patent Office 3,748,243
Patented July 24, 1973

3,748,243
PROCESS FOR THE PRODUCTION OF
1,1,1-TRICHLOROETHANE
Bernard Christiaens and Guy Martens, Brussels, Belgium, assignors to Solvay & Cie, Brussels, Belgium
Filed June 7, 1971, Ser. No. 150,361
Claims priority, application Belgium, June 8, 1970, 90,049; Nov. 19, 1970, 96,503
Int. Cl. B01j 1/10; C07c 17/00
U.S. Cl. 204—163 R     6 Claims

ABSTRACT OF THE DISCLOSURE

A process for the photochlorination of gaseous 1,1-dichloroethane to 1,1,1-trichloroethane, characterized in that the reaction is carried out at temperatures between 60 and 150° C. at a molar ratio, chlorine-to-1,1-dichloroethane, of between 1 and 4 and a residence time of the reagents in the reactor of between $1/50 n$ and $1/2500 n$, $n$ being equal to the square root of the luminous intensity absorbed by the chlorine, expressed in Einstein$\cdot$l$^{-1}\cdot$sec.$^{-1}$.

BACKGROUND OF THE INVENTION

The present invention relates to an improved process for the production of 1,1,1-trichloroethane. It comprises more particularly a process for the photochlorination of 1,1-dichloroethane into 1,1,1-trichloroethane.

It has been proposed to chlorinate 1,1-dichloroethane photochemically in a solvent such as carbon sulphide (Muraoka, R., Asahi Garasu Kenkyer Hokoku, 1966, 16, p. 123–132). This process permits working at low temperature, but it is then necessary to separate the solvent from the 1,1,1-trichloroethane produced. This separation must be very thorough because traces of sulphur derivatives make 1,1,1-trichloroethane unsuitable for use (odor, etc.). In addition, since carbon sulphide is a highly inflammable solvent, the process is difficult to carry out industrially.

Finally, it has also been proposed to chlorinate 1,1-dichloroethane photochemically in the gas phase. The principle of the reaction, which has been known for a long time (Sutton, Proc. Roy. Soc., 1931, A-133, pp. 673–674), has been improved. In a Dynamit Nobel patent (French Pat. No. 1,436,453), it has been proposed to inject 1,1-dichloroethane into the reactor in liquid form; the liquid is vaporized by the effect of the heat of reaction. In a Pechiney patent (French Pat. No. 1,390,398 of Jan. 16, 1964) it is proposed to cool the reactional mixture with the aid of a heat exchange surface.

Up to the present time the photochemical process has had a very great disadvantage from the industrial point of view; in order to avoid the formation of polychlorinated products, chlorine-to-1,1-dichloroethane ratios substantially lower than unity are used. Only a small fraction of the 1,1-dichloroethane introduced into the reactor is therefore converted and it is consequently necessary to separate the unconverted 1,1-dichloroethane from the 1,1,1-trichloroethane produced and to recycle it to the photochlorination reactor. Operations of this kind are very expensive to carry out industrially. Moreover, when a low chlorine-to-1,1-dichloroethane ratio is used, an hourly production of 1,1,1-trichloroethane is obtained which is very low for a given reactor.

SUMMARY OF THE INVENTION

An object of the present invention therefore is to provide a photochemical process wherein it is possible to overcome these disadvantages of the prior photochemical process while at the same time avoiding the formation of polychlorinated products.

This as well as other objects which will become apparent in the discussion that follows are achieved, according to the present invention, by a process for the production of 1,1,1-trichloroethane by photochemical chlorination in the gas phase of 1,1-dichloroethane at temperatures between 60 and 150° C. characterized in that the molar ratio of chlorine-to-1,1-dichloroethane is between 1 and 4 and the residence time of the reagents in the reactor is kept between $1/50 n$ and $1/2500 n$ second, $n$ being equal to the square root of the luminous intensity absorbed by the chlorine, expressed in Einstein$\cdot$l$^{-1}\cdot$sec.$^{-1}$.

The reagents preferably stay in the reactor for between $1/125 n$ and $1/1250 n$ seconds, $n$ being equal to the square root of the luminous intensity absorbed by the chlorine expressed in Einstein$\cdot$l$^{-1}\cdot$sec.$^{-1}$, when the chlorine-to-1,1-dichloroethane molar ratio is between 1 and 4.

The luminous intensity absorbed by the chlorine is calculated by Beer-Lambert's law, the concentration of chlorine, incident luminous intensity, and the radius of the reactor being known (S. Glasstone, Textbook of Physical Chemistry, Van Nostrand Co., 1946, p. 581).

GENERAL ASPECTS OF THE INVENTION

The process according to the invention is very interesting because, with its high conversion rate of 1,1-dichloroethane, the amount of 1,1-dichloroethane to be recycled can be reduced to a minimum. Those operations well known to be very expensive to carry out industrially are thus reduced.

By applying the process according to the invention, the productivity of a given reactor is also increased, while at the same time excellent selectivity is obtained, selectivity here referring to the preferred formation of 1,1,1-trichloroethane as opposed to other substances such as 1,1,2-trichloroethane.

A particularly interesting process for the production of 1,1,1-trichloroethane according to the present invention comprises the following stages:

(a) Introduction of a gaseous mixture of chlorine and 1,1-dichloroethane in a molar ratio between 1 and 4 into a reaction zone.

(b) Irradiation of this gaseous mixture in the reaction zone, which is kept at a temperature between 60 and 150° C., by the radiation emitted by a light source for $1/50 n$ to $1/2500 n$ seconds, $n$ being equal to the square root of the luminous intensity absorbed by the chlorine expressed in Einstein$\cdot$l$^{-1}\cdot$sec.$^{-1}$, so as to obtain 1,1,1-trichloroethane and hydrogen chloride.

(c) Condensation of the products coming from the reaction zone in such a manner as to obtain a gaseous phase containing chlorine and hydrogen chloride and a liquid phase containing, among other products, the 1,1,1-trichloroethane formed.

(d) Absorption of the chlorine present in the gaseous phase obtained in stage (c) in a liquid organic fraction.

(e) Desorption of the chlorine of the liquid phase containing the 1,1,1-trichloroethane obtained in stage (c) and of the solution obtained in stage (d) and recycling of the chlorine thus recovered to the 1,1,1-trichloroethane reaction zone.

(f) Separation of the liquid organic phase free from chlorine obtained in stage (e) into two substantially identical fractions, one being used in stage (d) for the absorption of the chlorine and the other being passed to a distillation unit in order to recover pure 1,1,1-trichloroethane.

The chlorine is introduced in gas form into the photochlorination reactor and the 1,1-dichloroethane may be introduced in either gas or liquid form; the latter case the 1,1-dichloroethane vaporizes in the reactor as a result of the heat of reaction.

A gaseous diluent may also be introduced into the reactor through an independent pipe or through the pipes used for the chlorine and 1,1-dichloroethane. An inert gas, or hydrogen chloride, may be used as a gaseous diluent. This diluent permits easy elimination of the heat of reaction; nevertheless, it is not indispensable.

The pressure in the photochlorination reactor may be lower than, equal to, or higher than atmospheric pressure. It is usually between 0.5 and 10 kg./cm.² The temperature is kept between 60 and 150° C.

The 1,1-dichloroethane chlorination reactor is provided with sources of actinic light in order to initiate the photochlorination reaction and with heat exchangers to eliminate the heat of reaction. The actinic light sources used are those which emit radiations absorbed by chlorine and the wavelength of which is between 2500 and 4500 A. Mercury vapor lamps and fluorescent tubes are generally used. The light sources are usually placed in the center of a reactor, while the reactors may be annular, form a spiral, or be tubular. The light source or sources may also be placed between different parallel tubular reactors fed simultaneously, or be placed perpendicularly to a bundle of tubular reactors.

The reaction products, which comprise 1,1,1-trichloroethane, 1,1,2-trichloroethane, hydrogen chloride and heavy products, as well as 1,1-dichloroethane and chlorine which have not reacted, are condensed at temperatures between —40 and +20° C. at a pressure of from 0.5 to 10 kg./cm.² A gaseous phase is thus obtained which contains chlorine and the hydrogen chloride, while the liquid phase contains organic materials (1,1,1- and 1,1,2-trichloroethane, 1,1-dichloroethane, heavy products, etc.) together with absorbed chlorine.

The chlorine present in the gas phase is absorbed at temperatures between —25 and +20° C. in a liquid organic fraction which is preferably the production crude and which therefore contains 1,1,1-trichloroethane, 1,1,2-trichloroethane, 1,1-dichloroethane, and heavy products. A product which is inert under the operating conditions may also be used as the liquid organic fraction.

The chlorine is then desorbed from this liquid organic fraction and also from the liquid phase obtained after condensation, by heating at 50–150° C. at a pressure between 1 and 10 kg./cm.²

The 1,1-dichloroethane may, for example, be obtained by hydrochlorination of vinyl chloride or by chlorination of ethane or ethyl chloride.

The hydrogen chloride produced in the photochlorination stage may advantageously be used to hydrochlorinate vinyl chloride into 1,1-dichloroethane. The 1,1-dichloroethane thus obtained is passed to the photochemical chlorination stage after purification.

The reaction, hydrochlorination of vinyl chloride into 1,1-dichloroethane, is carried out at low temperatures between 0 and 160° C., depending on the reaction pressures.

The pressure in the hydrochlorination reactor may be lower than, equal to, or higher than atmospheric pressure. It is usually between 0.5 and 10 kg./cm.² The solvent is most usually composed essentially of 1,1-dichloroethane produced by the reaction. Other non-aqueous solvents which are inert under the reaction conditions may also be used, such as the trichloroethanes, tetrachloroethanes, carbon tetrachloride, etc., or one of the by-products of the reaction, such as 1,1,3-trichlorobutane. As catalyst, the solvent contains a metallic chloride such as a chloride of aluminum, iron, zinc, or mercury, or the like.

A particularly interesting process lies in utilizing the hydrogen chloride produced in the photochlorination stage to hydrochlorinate vinyl chloride in a boiling liquid phase under conditions such that the 1,1-dichloroethane formed leaves the reaction medium in vapor form. The 1,1-dichloroethane thus obtained is passed to the photochemical chlorination stage without it being necessary to provide a 1,1-dichloroethane purification stage.

This improved process for the production of 1,1,1-trichloroethane according to the invention comprises the following stages:

(a) A mixture of vinyl chloride and hydrogen chloride is reacted, in the presence of a catalyst, in a boiling liquid bath in such a manner as to evacuate in vapor form the products of the reaction, comprising principally 1,1-dichloroethane together with unconverted hydrogen chloride and/or unconverted vinyl chloride;

(b) The products obtained in stage (a) are separated in such a manner as to obtain a liquid phase containing principally 1,1-dichloroethane and a gas phase containing principally the unconverted hydrogen chloride and/or unconverted vinyl chloride;

(c) The gas phase obtained in stage (b) is recycled to stage (a);

(d) The 1,1-dichloroethane obtained in stage (b) is subjected to the action of chlorine, the chlorine-to-1,1-dichloroethane molar ratio being between 1 and 4, in a reaction zone kept at a temperature between 60 and 150° C., in which the reagents are subjected to the radiation of a light source for $\frac{1}{50}n$ to $\frac{1}{2500}n$ second, $n$ being equal to the square root of the luminous intensity absorbed by the chlorine, expressed in Einstein·l$^{-1}$·sec.$^{-1}$, in such a manner as to obtain 1,1,1-trichloroethane at the same time as hydrogen chloride;

(e) The products obtained in stage (d) are condensed so as to obtain a liquid phase containing principally the 1,1,1-trichloroethane formed, together with unconverted 1,1-dichloroethane and unconverted chlorine, and a gas phase containing chlorine and hydrogen chloride;

(f) The chlorine present in the gas phase obtained in stage (e) is absorbed in a liquid organic fraction in such a manner as to obtain a gas phase containing only hydrogen chloride and a liquid organic fraction containing dissolved chlorine;

(g) The gaseous hydrogen chloride obtained in stage (f) is recycled to the hydrochlorination stage (a);

(h) The chlorine present with the 1,1,1-trichloroethane and 1,1-dichloroethane in the liquid phase obtained in stage (e) is desorbed in such a manner as to obtain gaseous chlorine and a liquid phase containing mainly 1,1,1-trichloroethane and 1,1-dichloroethane;

(i) The chlorine absorbed in stage (f) in a liquid organic fraction is desorbed so as to obtain gaseous chlorine and a liquid organic fraction free from chlorine, which is recycled to stage (f);

(j) The gaseous chlorine obtained in stages (h) and (i) is recycled to the chlorination stage (d);

(k) The liquid phase containing mainly 1,1,1-trichloroethane and 1,1-dichloroethane and obtained in stage (h) is separated into a gaseous phase containing 1,1-dichloroethane, which is recycled to the chlorination stage (d), and a liquid phase containing mainly the 1,1,1-trichloroethane product.

When boiling-hydrochlorination of vinyl chloride is used, the operating temperature of the hydrochlorination reactor is controlled by the vaporization of the 1,1-dichloroethane formed at the reaction pressure, the other operating conditions (catalyst, solvent) being identical to those used for the cold hydrochlorination of vinyl chloride. Temperatures from 35 to 160° C. are preferably used depending on the particular reaction pressure from 0.5 to 10 kg./cm.²

The vapors leaving the hydrochlorination zone and containing 1,1′-dichloroethane mixed with unconverted hydrogen chloride and/or unconverted vinyl chloride may advantageously by passed to a distillation zone, the calories necessary for the distillation being provided by the hydrochlorination reaction and carried by the vapors resulting from said hydrochlorination. At the top of the distillation column the unconverted hydrogen chloride and/or unconverted vinyl chloride are collected. The liquid phase accumulating at the foot of the distilling column contains almost exclusively 1,1-dichloroethane. Part of this liquid phase is returned to the reactor to be re-vaporized and part may be passed untreated to the photochlorination zone. In a process of this kind it is also advantageously possible to collect the 1,1-dichloroethane at one of the plates of the distillation column while liquid accumulating in the still is returned to the hydrochlorination zone. In this case it is advantageously possible to use a reactor directly surmounted by a distilling column, the liquid hydrochlorination phase lying then in what constitutes the still of the distilling column.

The hydrochlorination reaction may take place in the presence of an excess of hydrogen chloride. If all the vinyl chloride has been converted in the hydrochlorination reactor, the vapors leaving the reactor contain only 1,1-dichloroethane and hydrogen chloride. A mixture of this kind may advantageously be passed to the photochemical chlorination zone without any intermediate separation. The process then comprises the following stages:

(a) A mixture of vinyl chloride and an excess of hydrogen chloride is reacted, in the presence of a catalyst, in a boiling liquid phase, in such a manner as to discharge in vapor form the products of the reaction which comprise mainly 1,1-dichloroethane and also the excess hydrogen chloride;

(b) The gaseous mixture of 1,1-dichloroethane and hydrogen chloride obtained in stage (a) is subjected to the action of chlorine, the chorine-to-1,1-dichloroethane molar ratio being between 1 and 4, in a reaction zone kept at a temperature between 60 and 150° C. in which the reagents are subjected to the radiation emitted by a light source for $\frac{1}{50}n$ to $\frac{1}{2500}n$ second, $n$ being equal to the square root of the luminous intensity absorbed by the chlorine, expressed in einstein$\cdot 1^{-1}\cdot$sec.$^{-1}$. 1,1,1-trichloroethane is thus obtained at the same time as hydrogen chloride.

(c) The products obtained in stage (b) are condensed in such a manner as to obtain a liquid phase containing principally the 1,1,1-trichloroethane formed and also unconverted 1,1-dichloroethane and unconverted chlorine, and a gas phase containing chlorine and hydrogen chloride.

(d) The chorine present in the gaseous phase obtained in stage (c) is absorbed in a liquid organic fraction in such a manner as to obtain a gaseous phase containing only hydrogen chloride, and a liquid organic fraction containing dissolved chlorine.

(e) The gaseous hydrogen chloride obtained in stage (d) is recycled to the hydrochlorination stage (a).

(f) The chlorine present with the 1,1,1-trichloroethane and 1,1-dichloroethane in the liquid phase obtained in stage (c) is desorbed in such a manner as to obtain gaseous chlorine and a liquid phase containing mainly 1,1,1-trichloroethane and 1,1-dichloroethane.

(g) The chlorine absorbed in stage (d) in a liquid organic fraction is desorbed so as to obtain gaseous chlorine and a liquid organic fraction free from chlorine, this liquid organic fraction being recycled to stage (d).

(h) The gaseous chlorine obtained in stages (f) and (g) is recycled to the chlorination stage (b).

(i) The liquid phase containing mainly 1,1,1-trichloroethane and 1,1-dichloroethane obtained in stage (f) is separated into a gaseous phase containing 1,1-dichloroethane, which is recycled to the chlorination zone (b), and a liquid phase containing mainly the 1,1,1-trichloroethane produced.

The process of the present invention permits the obtaining of high yields of 1,1,1-trichloroethane vis-à-vis the vinyl chloride introduced.

In addition, the process permits continual operation for producing 1,1,1-trichloroethane, in apparatus which is particularly simple to provide industrially.

DESCRIPTION OF THE PREFERRED EMBODIMENTS

Figure 1:
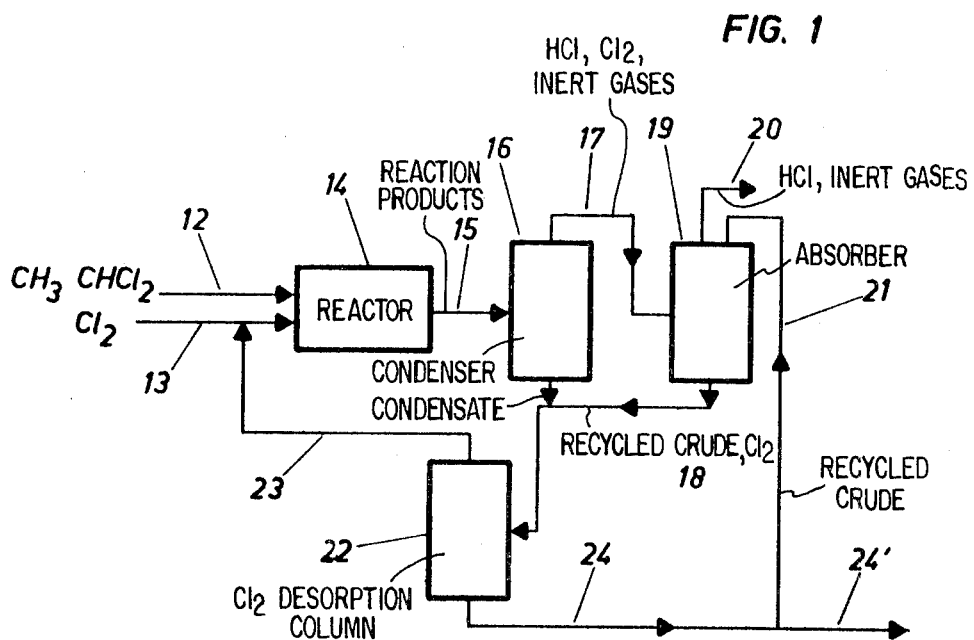
FIGS. 1, 2, 3, 4, 5 and 6 are flow diagrams of the process of the invention.

According to the diagram in FIG. 1, the 1,1-dichloroethane and chlorine are introduced respectively through the pipes 12 and 13 into the reactor 14 in which the photochemical chlorination of 1,1-dichloroethane into 1,1,1-trichloroethane is effected.

The reaction products, which comprise the 1,1,1-trichloroethane, the 1,1,2-trichloroethane, hydrogen chloride, and heavy products and also 1,1-dichloroethane and chlorine which have not reacted, leave the reactor through the pipe 15 and are condensed in condenser 16, for example in a water condenser and in a brine condenser at —20° C., which condensers are connected in series. The gases leaving the condensation stage through pipe 17 (chlorine, hydrogen chloride, and any inert gases) are separated in absorber 19 by absorption of the chlorine at 0° C. in a recycled production crude introduced through line 21. The hydrogen chloride and any inert gases leave the absorption column through line 20. The condensates obtained at condenser 16 and the recycled crude containing the chlorine obtained in absorber 19 are mixed and passed through the line 18 to a column 22 in which the chlorine is desorbed from the mixture by heating. The chlorine leaves the desorption column through pipe 23; it is mixed with fresh chlorine supply 13 and recycled to the reactor 14.

Figure 2:
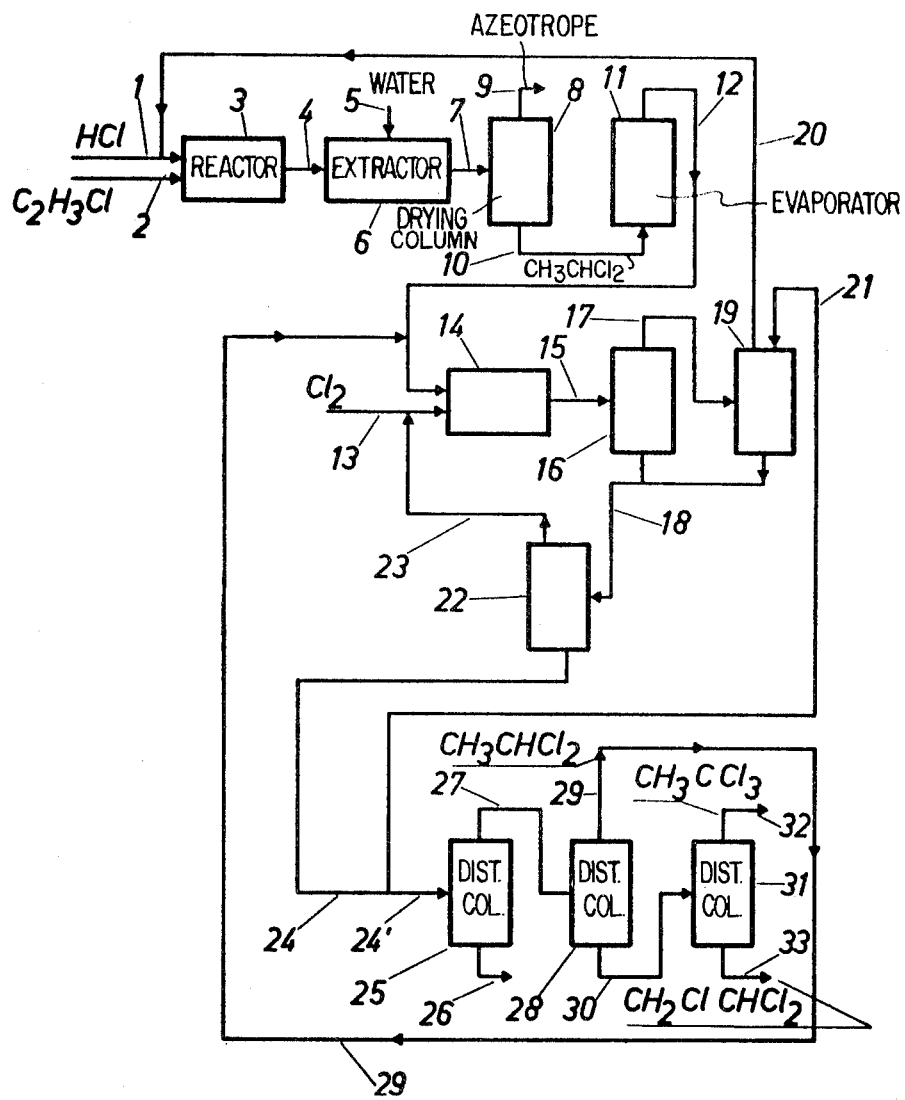

The 1,1-dichloroethane supplied to the photochlorination zone may be produced by any means known in itself, advantageously by hydrochlorination of vinyl chloride as indicated diagrammatically in FIG. 2. According to the diagram in FIG. 2, hydrogen chloride and vinyl chloride are introduced through the pipes 1 and 2 respectively into the hydrochlorination reactor 3.

By hydrochlorinating the vinyl chloride at 25–30° C. in a liquid bath of 1,1-dichloroethane as solvent in the presence of 2 to 10 g. of ferric chloride as catalyst per liter of 1,1-dichloroethane, a molar yield of 98% of 1,1-dichloroethane referred to the vinyl chloride converted is obtained.

The 1,1-dichloroethane formed in the reactor 3 is passed through the line 4 to a purification zone such as an extractor 6, in which it is washed with water 5 or with an aqueous solution of caustic soda in order to remove the residual ferric chloride and hydrogen chloride, and is then decaned and passed through the line 7 to column 8, where it is dried by azeotropic distillation; the azeotrope is eliminated through line 9 and the dry 1,1-dichloroethane collected at 10. The dry 1,1-dichloroethane passes to an evaporator 11, and then is passed through the line 12 to a second reactor 14 in which the synthesis of 1,1,1-trichloroethane is effected by photochlorination of the 1,1-dichloroethane with gaseous chlorine introduced into the reactor 14 through the pipes 13 and 23. The products obtained comprise 1,1,1-trichloroethane, 1,1,2-trichloroethane, polychlorinated products, and hydrogen chloride, as well as chlorine and 1,1-dichloroethane which have not reacted. These products leave the reactor through pipe 15 and are condensed in condenser 16.

The gaseous phase leaving the condensation column through pipe 17 and containing chlorine and hydrogen chloride is washed in absorber 19 by a recycled production crude, in order to remove the chlorine. The hydrogen chloride escapes through line 20 and at least part of it is recycled to the inlet 1 of the hydrochlorination reactor 3.

The recycled crude containing the chlorine which is collected at the foot of absorber 19 and the condensate collected at the foot of condenser 16 are mixed and passed through the line 18 to a column 22, in which the chlorine is desorbed from the mixture by heating and recycled via pipe 23 to the fresh chlorine supply 13 and passed to the photochlorination reactor 14. The organic materials collected at the foot of column 22 through line 24, above referred to as the "crude," are separated into a fraction which is recycled through the pipe 21 to the chlorine absorption column 19 and a product rich in 1,1,1-trichloroethane which is passed through the line 24' to a first distillation column 25. The column 25 may operate at reduced pressure; at the foot of the column the high boiling point products, such as 1,1,2-trichloroethane, tetrachloroethanes, and pentachloroethane, are collected through line 26. The fraction leaving the top of the column 25 is passed through the pipe 27 to a second distilling column 28, in which the unreacted 1,1-dichloroethane is eliminated at the top. The 1,1-dichloroethane thus obtained is recycled through the line 29 to the line 12 supplying 1,1-dichloroethane to the photochlorination 14. At the foot of the column 28 there is collected through line 30 a fraction having a very high content of 1,1,1-trichloroethane, which is passed to a last distilling column 31 operating under reduced pressure and intended particularly to eliminate through line 33 the residual 1,1,2-trichloroethane. The pure 1,1,1-trichloroethane is collected at the head of the column through line 32.

Figure 3:
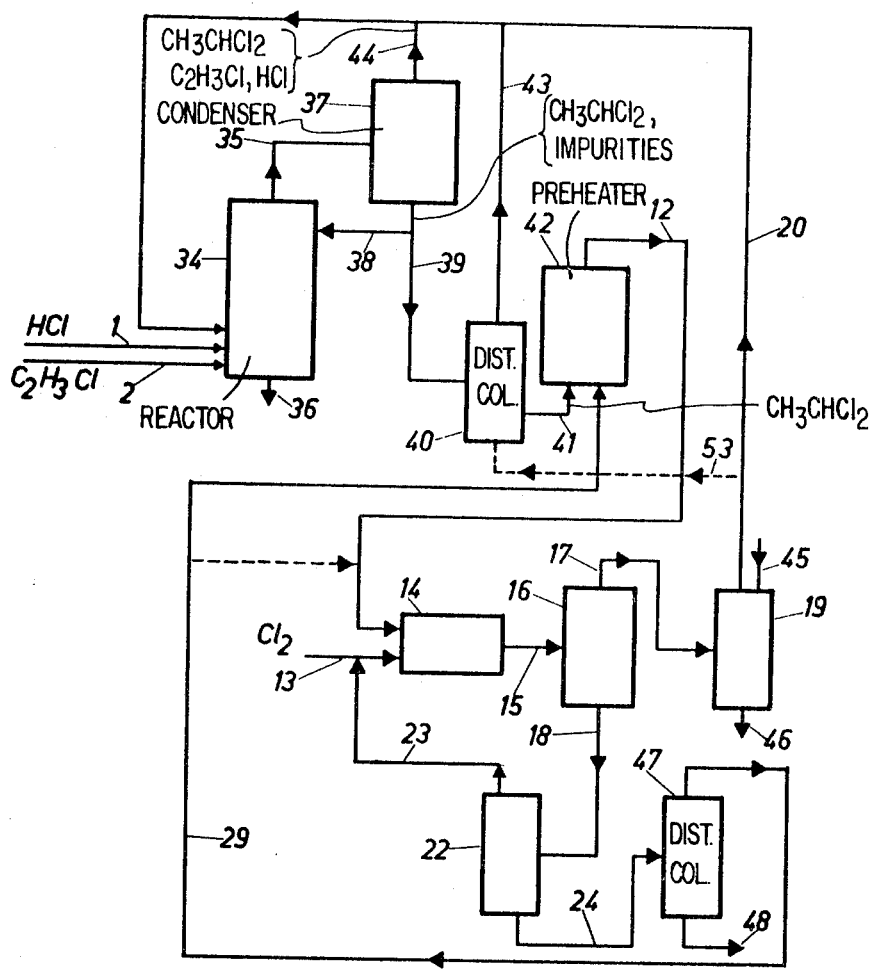

According to the diagram of FIG. 3 the vinyl chloride and a supply of hydrogen chloride are introduced respectively through the pipes 2 and 1 into hydrochlorination reactor 34, the operating temperature of which is controlled by the vaporization of the 1,1-dichloroethane formed at the reaction pressure.

The temperature of the reactor is generally between 35 and 160° C. depending on the reaction pressure, which may vary from 0.5 to 10 kg./cm.$^2$. The catalyst and the reaction solvent are the same as those used in a hydrochlorination reactor operating at low temperature, such as in FIG. 2.

The main impurity produced during the reaction is 1,1,3-trichlorobutane; because of its high boiling point, this impurity accumulates in the foot of the reactor. A drain 36 enables this product to be eliminated if desired, together with part of the used catalyst. This slight loss of catalyst is made up by periodic additions of fresh catalyst.

The vapors, composed mainly of the 1,1-dichloroethane formed, unconverted vinyl chloride, and unconverted hydrogen chloride, leave the reactor through the line 35 and are partly condensed in condenser 37. The vapor phase obtained from condenser 37 and still containing a little 1,1-dichloroethane together with practically all the vinyl chloride and hydrogen chloride which were not converted in the hydrochlorination reaction is recycled through the line 44 to the reactor 34. The liquid phase obtained at 37, composed essentially of 1,1-dichloroethane, is passed through the line 39 to the distillation column 40, at the foot of which pure 1,1-dichloroethane is collected. At the head of the column 40 there are eliminated through the line 43 the vinyl chloride and hydrogen chloride which may still be present as impurities in the 1,1-dichloroethane, and the two products are recycled through the line 44 to the reactor 34. The liquid 1,1-dichloroethane collected at 40 is passed through the line 41 to a preheater 42 before being passed to the photochlorination reactor 14 through the line 12. The preheater 42 is used only if it is desired to introduce the 1,1-dichloroethane in gaseous form into the reactor. A process can also be conceived in which the 1,1-dichloroethane is introduced in liquid form into the photochlorination reactor.

In the modification of the process the column 40 is a stripper for the stripping of the vinyl chloride contained in the 1,1-dichloroethane with the aid of the hydrogen chloride circulating in the pipe 20 and supplied at 40 through the pipe 53.

The 1,1-dichloroethane and chlorine are introduced respectively through the pipes 12 and 13 into the reactor 14 in which the photochemical chlorination of the 1,1-dichloroethane into 1,1,1-trichloroethane is effected.

The reaction products, which comprise the 1,1,1-trichloroethane the 1,1,2-trichloroethane, hydrogen chloride and heavy products, as well as 1,1-dichloroethane and chlorine which have not reacted, leave the reactor through the pipe 15 and are condensed in condenser 16. The gases passing out of the condensation stage (chlorine, hydrogen chloride, and possibly inert gases) are passed through the line 17 to absorber 19 where they are separated by absorption of the chlorine at 0° C. in a recycled product entering through line 45. This recycled product may optionally be the production crude or an organic product which is inert under the operating conditions, such as hexachlorobutadiene. The hydrogen chloride and any inert gases leave the absorption column through line 20. The condensate obtained from condenser 16 is passed through the line 18 to a column 22 in which the chlorine is desorbed from the mixture by heating. The desorption of the chlorine contained in the recycled product collected at line 46 is not illustrated in the drawing. The chlorine leaves the desorption column 22 through line 23 and is mixed with the fresh chlorine supply 13, then recycled to the reactor 14.

The organic materials collected at the foot of column 22 through line 24 are passed into a distillation column 47. At the head of the column 47 the 1,1-dichloroethane is collected, which is recycled through the line 29 either to the preheater 42 or directly to the photochlorination reactor 14. At the foot of the column 47 there is collected through line 48 a fraction having a high 1,1,1-trichloroethane content, which may optionally be subjected to further purification treatments such as rectifications.

Figure 4:
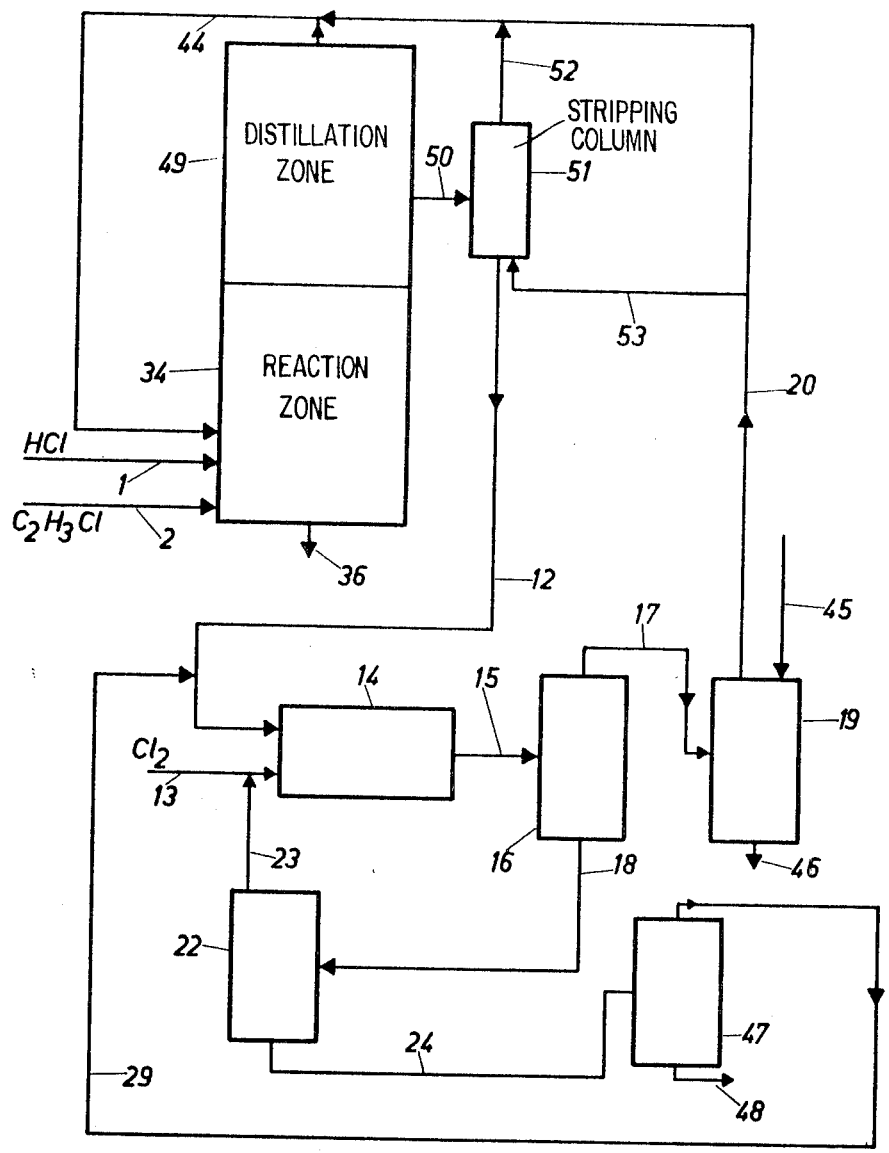

The diagram of FIG. 4 differs from that shown in FIG. 3 with regard to the hydrochlorination installation.

According to the diagram of FIG. 4, the hydrogen chloride and vinyl chloride are introduced into a reaction zone 34 of an apparatus through the lines 1 and 2.

The reaction zone contains a catalyst, which is a metallic chloride such as ferric chloride, and an organic solvent which is usually 1,1-dichloroethane. The mixture contained in the reaction zone is brought to boiling point. This boiling of the mixture causes an evacuating of the products of the reaction in vapor form. The vapors formed leave the reaction zone and pass upwards into a distillation zone 49 of the apparatus. The light products, such as hydrogen chloride and/or vinyl chloride which have not reacted, leave the distillation zone through line 44 and are recycled to the reactor. At the level of one of the plates of the distillation zone which contains a large amount of 1,1-dichloroethane, a liquid fraction is withdrawn which is passed through the line 50 to a stripping column 51 for stripping any vinyl chloride in the liquid. The stripping may be effected with the aid of hydrogen chloride circulating in the pipe 20 and supplied at 51 through the pipe 53. The fraction collected at the head of the stripping column is sent back to the reactor through the lines 52 and 44, while at the foot of the stripping column 51 there is collected through the line 12 the 1,1-dichloroethane which can be vaporised or be sent untreated to the photochlorination zone to be evaporated by the heat of reaction.

The remainder of the diagram of FIG. 4 is identical to that of FIG. 3.

Figures 5, 6:
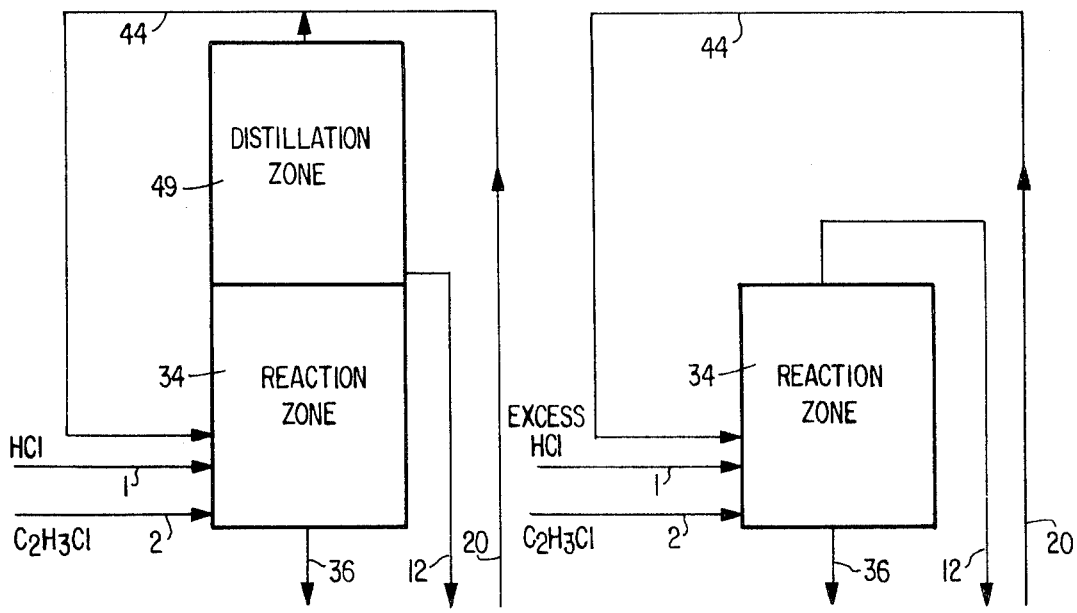

FIG. 5 illustrates a modification of the flow diagram of FIG. 4. In this case, stripping column 51 is omitted and line 12 is connected directly to the foot of the distillation zone to collect a liquid phase containing principally 1,1-dichloroethane. This is rendered gaseous in reactor 14 by the exothermic reaction taking place within the reactor.

FIG. 6 illustrates another modification of the flow diagram of FIG. 4. In this case, the quantity of HCl fed into reaction zone 34 is in sufficient excess that the vapors leaving at the top of the zone contain principally 1,1-dichloroethane and hydrogen chloride, and no vinyl chloride. Line 12 brings these vapors directly to reactor 14. The hydrogen chloride introduced into reactor 14 acts as a gaseous diluent for eliminating heat.

The process of the invention offers numerous advantages. As the following example shows, by operating under the conditions claimed it is possible to obtain a high rate of conversion of the 1,1-dichloroethane. A high yield of 1,1,1-trichloroethane, higher than that obtained in other processes, is also obtained; the process offers the great advantage of producing very little by-products. Finally, an hourly production of 1,1,1-trichloroethane which is particularly high for a given reactor is obtained.

In addition, the process used for recovering unreacted chlorine, by washing the gases passing out of the stage of condensation of the reaction products, with a recycled product composed of the production crude, makes it possible to avoid the use of a separate desorption column for the supplementary chlorine, which is indispensable when use is made of an organic compound not participating in the reaction.

Furthermore, it is possible to use practically all the hydrogen chloride produced in the chlorination of the 1,1-dichloroethane for the stage of hydrochlorination of vinyl chloride into 1,1-dichloroethane.

The following examples illustrate the invention further.

Example I

Figure 8:
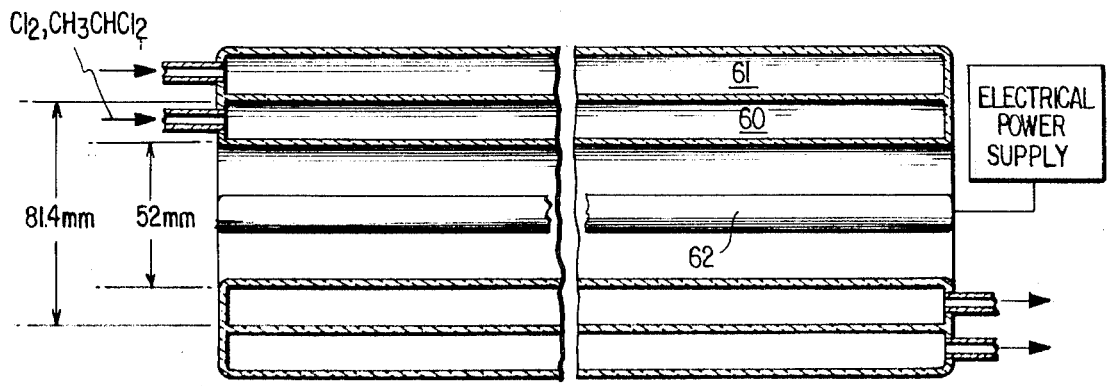
FIG. 8 is a sectional view along the line 8—8 of FIG. 7.
Figure 7:
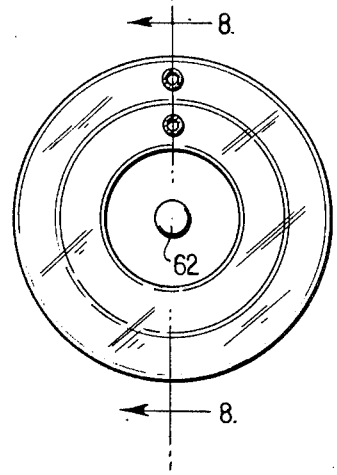
FIG. 7 is an end view of a reactor for practicing the invention.

The photochlorination of 1,1-dichloroethane was effected in the continuous reactor of FIG. 8 composed of two coaxial cylindrical annuli chambers 60 and 61 of clear glass surrounding a light source 62 connected to an electrical power supply. The inner annulus chamber 60 (inside diameter 52 mm., outside diameter 81.4 mm.) constitutes the actual reactor, the outer annulus chamber 61 serving for the circulation of a liquid permitting the removal of part of the heat of reaction. The volume of the reactor is 3.634 liters.

The light source is a Philips TL 5-120 watt lamp supplying a radiation absorbable by chlorine of $16.6 \times 10^{-6}$ Einstein $\cdot l^{-1} \cdot sec.^{-1}$. The quantities $\frac{1}{50}n$ and $\frac{1}{2500}n$ are approximately 5 seconds and 0.1 second respectively, for this radiation level.

The reagents are introduced at 60° C., the exothermicity of the reaction causing the temperature to rise to about 150° C. The flow of cooling fluid is controlled so as not to exceed the latter temperature.

The gases passing out of the reactor pass in succession into a condenser at room temperature and into a condenser at −20° C. They are then contacted at −20° C. with a solvent composed of the production crude, for yielding a substantially pure HCl gas which can be used for example for the synthesis of 1,1-dichloroethane by hydrochlorination of vinyl chloride. The chlorine is then desorbed from the condensate and production crude and recycled.

The test shown in the table were carried out at atmospheric pressure.

The table gives series of examples carried out with three different residence times in the reactor: 0.5, 1, and 2 seconds.

For each residence time the tests were carried out with different chlorine-to-1,1-dichloroethane molar ratios ranging from 0.6 to 4. Residence time was calculated by dividing the volume of the reactor in liters by the sum of the volume flow rates of the gaseous reactants in liters per second.

It has also been found that productivity depends on the luminous intensity absorbed by the chlorine. Tests carried out with a Philips TL 5-40 watt lamp supplying a luminous intensity absorbable by chlorine of $7.7 \times 10^{-6}$ Einstein $\cdot l^{-1} \cdot sec.^{-1}$ showed that the same results were obtained as shown in the table by using respective residence times of 0.75, 1.5, and 3 seconds instead of 0.5, 1, and 2 seconds. These results and also those obtained by the use of light sources of the same type but with their radiation rendered less intense by means of light absorbing filters showed that the residence times given in the table were inversely proportional to $n$, $n$ being the square root of the intensity absorbed by chlorine expressed in Einstein $\cdot l^{-1} \cdot sec.^{-1}$.

The same tests as those carried out in accordance with the table, at pressures of 0.5, 2, and 3 kg./cm.², showed that pressure had only a slight influence on optimum residence time and optimum chlorine-to-1,1-dichloroethane molar ratio.

Examination of the table shows that for each residence time the hourly production of 1,1,1-trichloroethane shows a maximum for an optimum chlorine-to-1,1-dichloroethane molar ratio between 1 and 4.

It is also seen that the rate of conversion of 1,1-dichloroethane increases with the residence time and the chlorine-to-1,1-dichloroethane molar ratio. On the other hand, when the residence time is lengthened the hourly production of 1,1,1-trichloroethane is reduced, for a given reactor. It is therefore seen that it is particularly interesting to use residence times between $\frac{1}{50}n$ and $\frac{1}{2500}n$ seconds, and more particularly between $\frac{1}{125}n$ and $\frac{1}{1250}n$ seconds, where $n$ is equal to the square root of the luminous intensity absorbed by chlorine expressed in Einstein $\cdot l^{-1} \cdot sec.^{-1}$, and at the same time to use a chlorine-to-1,1-dichloroethane molar ratio between 1 and 4.

Example II

The following example was carried out in accordance with the process illustrated in FIG. 3. The installation also comprises a system to circulate the gases which is not shown in the drawing.

The hydrochlorination reaction was carried out in a 140 liter reactor 34 containing 1,1-dichloroethane and 40 g. of ferric chloride per liter of 1,1-dichloroethane. 6.30 kg. of vinyl chloride per hour are introduced into the reactor through the line 2. The line 1 serves for introducing fresh hydrogen chloride into the reactor when starting up the installation and adding hydrogen chloride if this is found necessary. The temperature is 56° C. and the pressure is atmospheric. The vapors leaving the reactor through the line 35 are condensed at room temperature. The gases leaving at the top of the condenser 37 are recycled through the line 44 to the reactor. A total of 4.18 kg. per hour of vinyl chloride not converted by the hydrochlorination and 7.3 kg. of hydrogen chloride, of which about 3.6 kg. per hour comes from the photochlorination of the 1,1-dichloroethane and is recycled through the line 20, is recycled through the line 44. At the foot of the condenser 37 1,1-dichloroethane is collected, of which part is recycled through the line 38 to the reactor 34 so as to maintain a constant liquid bath level. The other part of the liquid collected at the foot of the condenser is passed through

TABLE

| Test No. | Residence time, sec. | Molar ratio Cl₂/ CH₂/CH₃Cl₂ | Feed, kg./hour | | Production kg./h. CH₃-CCl₃ | Moles CH₃-CCl₃/ moles CH₂Cl- CHCl₂ | Rate of conversion of 1,1-dichloroethane (molar percent) | Yield of chlorinated products referred to 1,1-dichloroethane converted (molar percent) | | | | |
|---|---|---|---|---|---|---|---|---|---|---|---|---|
| | | | Cl₂ | CH₃- CHCl₂ | | | | CH₃- CCl₃ | CH₂Cl- CHCl₂ | CH₂Cl- CCl₃ | CHCl₂- CHCl₂ | C₂HCl₅ |
| 1 | 0.5 | 0.6 | 22.0 | 51.2 | 10.37 | 6.8 | 17.3 | 86.9 | 12.8 | 0.2 | 0.1 | |
| 2 | | 2 | 41.0 | 28.6 | 16.56 | 7.9 | 49.1 | 87.1 | 11.0 | 1.3 | 0.6 | |
| 3 | | 4 | 51.6 | 18.0 | 14.65 | 8.5 | 70.6 | 85.5 | 10.1 | 3.2 | 1.1 | 0.1 |
| 4 | 1 | 0.6 | 13.4 | 31.3 | 8.71 | 7.0 | 23.8 | 86.6 | 12.3 | 0.8 | 0.3 | |
| 5 | | 2 | 19.9 | 13.9 | 11.74 | 7.5 | 71.4 | 85.9 | 11.5 | 1.9 | 0.6 | 0.1 |
| 6 | | 4 | 24.2 | 8.4 | 8.71 | 11.7 | 91.1 | 84.4 | 7.2 | 5.8 | 1.7 | 1.0 |
| 7 | 2 | 0.6 | 5.5 | 12.8 | 6.1 | 7.1 | 41.1 | 86.1 | 12.1 | 1.2 | 0.6 | |
| 8 | | 1 | 7.5 | 10.5 | 7.76 | 10.4 | 62.5 | 87.6 | 8.4 | 2.9 | 1.1 | |
| 9 | | 2 | 10.1 | 7.1 | 7.23 | 11.8 | 90.9 | 83.1 | 7.0 | 7.4 | 2.1 | 0.4 |
| 10 | | 4 | 11.7 | 4.15 | 4.36 | 27 | >99 | 78.0 | 2.9 | 14.3 | 3.4 | 1.5 | the line 39 to the column 40, where the vinyl chloride and hydrogen chloride which may still be present in the 1,1-dichloroethane are eliminated and recycled to the reactor through the lines 43 and 44.

9.92 kg. of 1,1-dichloroethane per hour is obtained in line 41. The yield of 1,1-dichloroethane referred to converted vinyl chloride is 99.5% in moles.

The 1,1-dichloroethane is vaporized in preheater 42 and passed through the line 12 to the photochlorination reactor 14. The photochlorination reactor has a volume of 3.634 liters. The reagents are introduced at 60° C. and the exothermicity of the reaction causes the temperature to rise to about 150° C. The light source is a Philips T1 5-120 watt lamp supplying a radiation absorbable by chlorine of $16.6 \times 10^{-6}$ Einstein·$l^{-1}$·sec.$^{-1}$.

13.9 kg. of 1,1-dichloroethane per hour—of which 3.98 kg. per hour comes from the 1,1-dichloroethane not converted in the photochlorination stage, recovered at column 47, and passed to the preheater 42 through the line 29— is passed to the photochlorination reactor. 19.9 kg. of chlorine per hour, of which part was recovered in column 22, is passed through the line 13.

The gas mixture, from the reactor 14, is condensed in condenser 16 including in succession a condenser operating at room temperature and a condenser operating at −20° C. The chlorine present in the gases coming from 16 is then absorbed in absorber 19 at −20° C. in a solvent composed of part of the production crude, collected from line 24. A little more than 3.6 kg. of hydrogen chloride per hour is collected at line 20 and returned to the hydrochlorination zone.

The chlorine present in the organic fraction collected through line 18 and line 46 is desorbed in column 22. 12.6 kg. of chlorine per hour is thus recovered and returned through line 13 to the reactor 14.

Through line 24 there is collected an organic phase free from chlorine and hydrogen chloride, which is distilled in column 47 so as to recover 3.98 kg. of 1,1-dichloroethane per hour. Subsequent. purification of the phase rich in 1,1,1-trichloroethane collected through line 48 gives 11.48 kg. per hour of pure 1,1,1-trichloroethane, which is equivalent to a yield of 85.4% referred to the fresh vinyl chloride introduced into the installation.

It will be understood that the above description of the present invention is susceptible to various modifications, changes and adaptations, and the same are intended to be comprehended within the meaning and range of equivalents of the appended claims.

We claim:

1. A process for the production of 1,1,1-trichloroethane by photochemical chlorination, comprising:
   (a) introducing a gaseous mixture of chlorine and 1,1-dichloroethane, the chlorine-to-1,1-dichloroethane molar ratio being between 1 and 4, into a reaction zone maintained at a temperature between 60 and 150° C.;
   (b) irradiating said gaseous mixture in said reaction zone with the radiation emitted by a light source for a residence time of $\frac{1}{50}n$ to $\frac{1}{2500}n$ seconds, $n$ being equal to the square root of the lumnious intensity absorbed by the chlorine, expressed in $$\text{Einstein} \cdot l^{-1} \cdot \text{sec.}^{-1}$$

to obtain 1,1,1-trichloroethane and hydrogen chloride;
   (c) withdrawing the resulting gaseous mixture from said reaction zone;
   (d) cooling said mixture to obtain a gaseous phase containing chlorine and hydrogen chloride and a liquid phase containing among other products, the 1,1,1-trichloroethane formed;
   (e) absorbing in a liquid organic fraction the chlorine present in the gas phase obtained in step (d);
   (f) desorbing the chlorine from the liquid phase containing the 1,1,1-trichloroethane obtained in step (d) and the chlorine from the solution obtained in step (e) and recycling the chlorine thus recovered to the 1,1,1-trichloroethane production zone;
   (g) separating the chlorine-free liquid organic phase obtaind in step (f) into two substantially identical portions; and
   (h) passing one of said portions to step (e) for absorbing the chlorine and passing the other portion to a distillation step to recover pure 1,1,1-trichloroethane therefrom.

2. A process according to claim 1 wherein the residence time is between $\frac{1}{125}n$ and $\frac{1}{1250}n$ seconds.

3. A process according to claim 1 wherein the photochemical chlorination is carried out under a pressure between 0.5 and 10 kg./cm.$^2$.

4. A process for the production of 1,1,1-trichloroethane by photochemical chlorination, comprising:
   (a) reacting a mixture of vinyl chloride and hydrogen chloride, in the presence of a catalyst, in a boiling liquid phase and withdrawing in vapor form the products of the reaction, comprising principally 1,1-dichloroethane as well as unconverted hydrogen chloride and/or unconverted vinyl chloride;
   (b) separating the vaporous products of step (a) into a liquid phase containing principally the 1,1-dichloroethane and a gas phase containing principally the unconverted hydrogen chloride and/or the unconverted vinyl chloride;
   (c) recycling to step (a) the gas phase obtained in step (b);
   (d) subjecting the 1,1-dichloroethane obtained in step (b) to the action of chlorine, the chlorine-to-1,1-dichloroethane molar ratio being between 1 and 4, in a reaction zone kept at a temperature between 60 and 150° C. under the radiation emitted by a light source during a residence time of $\frac{1}{50}n$ to $\frac{1}{2500}n$ second, $n$ being equal to the square root of the luminous intensity absorbed by the chlorine expressed in Einstein·$l^{-1}$·sec.$^{-1}$, for obtaining 1,1,1-trichloroethane and hydrogen chloride;
   (e) condensing the products obtained in step (d) to obtain a gas phase containing chlorine and hydrogen chloride and a liquid phase containing principally the 1,1,1-trichloroethane formed, as well as unconverted 1,1-dichloroethane and unconverted chlorine;
   (f) absorbing the chlorine present in the gas phase obtained in step (e) in a liquid organic fraction to obtain a gas phase containing hydrogen chloride and a liquid organic fraction containing dissolved chlorine;
   (g) recycling to step (a) the gaseous hyrogen chloride obtained in step (f);
   (h) desorbing the chlorine present with the 1,1,1-trichloroethane and 1,1-dichloroethane in the liquid phase obtained in step (e) to obtain gaseous chlorine and a liquid phase containing principally 1,1,1-trichloroethane and 1,1-dichloroethane;
   (i) desorbing the chlorine in the liquid organic fraction from step (f) to obtain gaseous chlorine and a liquid organic fraction free from chlorine, and recycling to step (f) this chlorine-free fraction;
   (j) recycling to step (d) the gaseous chlorine obtained in steps (h) and (i);
   (k) separating the liquid phase obtained in step (h) and containing principally 1,1,1-trichloroethane and 1,1-dichloroethane into a gase phase containing 1,1-dichloroethane, and a liquid phase containing mainly the 1,1,1-trichloroethane produced;
   (l) recycling to step (d) the 1,1-dichloroethane containing gas phase separated in step (k); and
   (m) recovering the liquid phase containing the 1,1,1-trichloroethane separated in step (k).

5. A process according to claim 4, wherein the gaseous mixture of 1,1-dichloroethane and unconverted hydrogen chloride and/or unconverted vinyl chloride obtained in step (a) is separated in step (b) by distillation in a distillation column into a gas phase containing the hydrogen chloride and/or the vinyl chloride, and a liquid phase containing the pure 1,1-dichloroethane, the heat necessary for the distillation being supplied by the additive hydrochlorination of vinyl chloride and being carried to the distillation column by the gaseous mixture leaving the hydrochlorination reactor, the hydrogen chloride and/or vinyl chloride being withdrawn in gas phase at the top of the distillation column, the purified 1,1-dichloroethane being withdrawn in liquid phase from a plate of the column, and the liquid phase accumulating at the foot of the column being recycled to step (a) and revaporized under the effect of the heat of the hydrochlorination reaction.

6. A process for the production of 1,1,1-trichloroethane by photochemical chlorination, comprising:
  (a) reacting a mixture of vinyl chloride and an excess of hydrogen chloride in the presence of a catalyst, in a boiling liquid phase, and withdrawing in vapor form the products of the reaction comprising principally 1,1-dichloroethane and hydrogen chloride;
  (b) subjecting the gaseous mixture of 1,1-dichloroethane and hydrogen chloride obtained in step (a) to the action of chlorine, the chlorine-to-1,1-dichloroethane molar ratio being between 1 and 4, in a reaction zone kept at a temperature between 60 and 150° C. and under the radiation emitted by a light source for a residence time of $\frac{1}{50}n$ to $\frac{1}{2500}n$ second, $n$ being equal to the square root of the luminous intensity absorbed by the chlorine expressed in Einstein$\cdot$l$^{-1}\cdot$sec.$^{-1}$, for obtaining, 1,1,1-trichloroethane and hydrogen chloride;
  (c) condensing the products obtained in step (b) to obtain a gas phase containing chlorine and hydrogen chloride and a liquid phase containing principally the 1,1,1-trichloroethane formed as well as unconverted 1,1-dichloroethane and unconverted chlorine;
  (d) absorbing in a liquid organic fraction the chlorine present in the gas phase obtained in step (c) to obtain a gas phase containing only hydrogen chloride and a liquid organic fraction containing dissolved chlorine;
  (e) recycling to step (a) the gaseous hydrogen chloride obtained in step (d);
  (f) desorbing the chlorine present with the 1,1,1-trichloroethane and 1,1-dichloroethane in the liquid phase obtained in step (c) to obtain gaseous chlorine and a liquid phase containing principally 1,1,1-trichloroethane and 1,1-dichloroethane;
  (g) desorbing the chlorine absorbed in step (d) in a liquid organic fraction for obtaining gaseous chlorine and a liquid organic fraction free from chlorine, and recycling to step (d) this chlorine-free fraction;
  (h) recycling to step (b) the gaseous chlorine obtained in steps (f) and (g);
  (i) separating the liquid phase obtained in step (f) and containing principally 1,1,1-trichloroethane and 1,1-dichloroethane into a gas phase containing 1,1-dichloroethane and a liquid phase containing principally the 1,1,1-trichloroethane produced;
  (j) recycling to step (b) this 1,1-dichloroethane containing gas phase; and
  (k) recovering liquid phase containing 1,1,1-trichloroethane.

References Cited

UNITED STATES PATENTS

| | | | |
|---|---|---|---|
| 3,019,175 | 1/1962 | Haefner et al. | 204—163 R |
| 3,113,079 | 12/1963 | Bergeron et al. | 260—658 R |
| 3,474,018 | 10/1969 | Goeb et al. | 203—163 R |

FOREIGN PATENTS

| | | | |
|---|---|---|---|
| 1,817,191 | 1969 | Germany | 260—658 R |
| 1,390,398 | 1964 | France | 204—163 R |
| 1,102,417 | 1968 | Great Britain | 204—163 R |

BENJAMIN R. PADGETT, Primary Examiner

R. GAITHER, Assistant Examiner

U.S. Cl. X.R.

260—658 R, 663